United States Patent
Dubrovsky et al.

(10) Patent No.: US 9,776,525 B2
(45) Date of Patent: Oct. 3, 2017

(54) ANTI-IDLING SYSTEM FOR AMBULANCES AND OTHER VEHICLES

(71) Applicant: Move Systems International, LLC, Long Island City, NY (US)

(72) Inventors: Michael Dubrovsky, Brooklyn, NY (US); Cody Rickman, Brooklyn, NY (US); Azra Horowitz, Long Island City, NY (US); Yelizaveta Kholodkova, Gainesville, FL (US); Tome Rey Verissimo, Cambridgeshire (GB); Jeffrey Hoffman, New York, NY (US)

(73) Assignee: Move Systems International, LLC, Long Island City, NY (US)

( * ) Notice: Subject to any disclaimer, the term of this patent is extended or adjusted under 35 U.S.C. 154(b) by 384 days.

(21) Appl. No.: 14/474,842

(22) Filed: Sep. 2, 2014

(65) Prior Publication Data
US 2016/0059804 A1    Mar. 3, 2016

(51) Int. Cl.
*B60R 16/03*    (2006.01)
*B60L 11/18*    (2006.01)

(52) U.S. Cl.
CPC ....... *B60L 11/1846* (2013.01); *B60L 11/1816* (2013.01); *B60L 11/1825* (2013.01); *B60L 11/1838* (2013.01); *B60L 2230/10* (2013.01); *B60L 2230/12* (2013.01); *B60L 2230/14* (2013.01); *B60L 2230/16* (2013.01); *Y02T 10/7005* (2013.01); *Y02T 10/7088* (2013.01); *Y02T 90/121* (2013.01); *Y02T 90/122* (2013.01); *Y02T 90/128* (2013.01); *Y02T 90/14* (2013.01);
(Continued)

(58) Field of Classification Search
CPC .............. B60L 11/1825; B60L 2230/10; B60L 2230/12; B60L 2230/14
See application file for complete search history.

(56) References Cited

U.S. PATENT DOCUMENTS

| 7,804,274 B2 * | 9/2010 | Baxter | B60L 11/1816 180/65.1 |
| 2002/0040266 A1 * | 4/2002 | Edgar | H02H 7/0851 701/49 |

(Continued)

*Primary Examiner* — Jared Fureman
*Assistant Examiner* — Joel Barnett
(74) *Attorney, Agent, or Firm* — Cooley LLP (57) ABSTRACT

The Anti-idling System for Ambulances and Other Vehicles is a novel system for making electricity available to vehicles which idle curbside in urban and suburban environments. The invention comprises a pedestal with a specialized electricity plug, a cord and cord reel, an onboard microcontroller with GSM and RFID card reader which controls the flow of electricity and communicates with a cloud-based management system, and a cloud-based management system which controls user authentication. This enables an ambulance or other vehicle operator to approach the pedestal, access the plug and cord and turn on the flow of electricity using an RFID card or mobile phone, and use the pedestal to power their vehicle while in proximity to the pedestal. When the vehicle engine is started, the system detects the auto-ejection of the plug from the vehicle, turns off the flow of electricity, and automatically retracts the plug and cord into the pedestal.

11 Claims, 14 Drawing Sheets

(52) U.S. Cl.
CPC .............. *Y02T 90/16* (2013.01); *Y02T 90/163* (2013.01); *Y02T 90/169* (2013.01); *Y04S 30/14* (2013.01)

(56) References Cited

U.S. PATENT DOCUMENTS

| | | | | |
|---|---|---|---|---|
| 2011/0106329 A1* | 5/2011 | Donnelly | ................... | B60L 3/12 700/291 |
| 2011/0140656 A1* | 6/2011 | Starr | ................... | B60L 11/1816 320/109 |
| 2011/0174875 A1* | 7/2011 | Wurzer | ............... | B60L 11/1816 235/380 |
| 2012/0326664 A1* | 12/2012 | Venegas, Jr. | ........ | B60L 11/1818 320/109 |
| 2014/0021915 A1* | 1/2014 | Staley | ................... | H01R 13/635 320/109 |

* cited by examiner

ANTI-IDLING SYSTEM FOR AMBULANCES AND OTHER VEHICLES

CROSS-REFERENCE TO RELATED APPLICATIONS

Not Applicable

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISC APPENDIX

Not Applicable

BACKGROUND OF THE INVENTION

The present disclosure generally relates to devices for deploying anti-idling technology using grid electricity in public spaces. There are many kinds of vehicles which would benefit from having access to grid electricity in public spaces. In particular, ambulances must idle in public spaces, sometimes for up to 14 hours per day while waiting for emergency calls, in order to keep their medicine refrigerated, their on-board electronics operable, their HVAC systems running, and their batteries operational. In doing so, these vehicles burn up to 1 gallon of diesel fuel per hour and put as many as 25 miles of wear on their engines per hour.

While electricity charging stations have been in place for a number of years for the charging of electric vehicles, and these devices may be suitable for the particular purpose which they address, they are not suitable for eliminating the idling of ambulances or other vehicles. Such charging stations are used to recharge a battery which resides in an electric vehicle. They are not designed to be used for anti-idling measures, and they do not provide a method for the automated refraction and securing of the electrification plug and cord when the vehicle has to depart.

In these respects, the anti-idling system for ambulances and other vehicles according to the present invention substantially departs from the conventional concepts and designs of the prior art, and in doing so it provides an apparatus primarily developed to securely and safely eliminate the idling of ambulances and other vehicles.

BRIEF SUMMARY OF THE INVENTION

In view of the foregoing disadvantages inherent in the known types of electricity charging stations in the prior art, the present invention provides a model uniquely suited to the kinds of vehicles which will access it. The general purpose of the present invention, which will be described subsequently in greater detail, is to provide a new anti-idling system that has many of the advantages of the electrification systems mentioned heretofore and many novel features that result in a new system which is not anticipated, rendered obvious, suggested, or even implied by any of the prior art electricity charging systems, either alone or in any combination thereof.

To attain this, the present invention generally comprises a pedestal with a specialized electricity plug, a cord and cord reel, an onboard microcontroller with GSM and RFID card reader which controls the flow of electricity and communicates with a cloud-based management system, and a cloud-based management system which controls user authentication. This enables an ambulance or other vehicle operator to approach the pedestal, access the plug and cord and turn on the flow of electricity using an RFID card or mobile phone, and use the pedestal to power their vehicle while in proximity to the pedestal. When the vehicle engine is started, the system detects the auto-ejection of the plug from the vehicle, turns off the flow of electricity, and automatically retracts the plug and cord into the pedestal.

There has thus been outlined, rather broadly, the more important features of the invention such that the detailed description thereof may be better understood and in order that the present contribution to the art may be better appreciated. There are additional features of the invention that will be described hereinafter which will form the subject matter of the claims appended hereto.

In this respect, before explaining at least one embodiment of the invention in detail, it is important to understand that the invention is not limited in its application to ambulances or to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

A primary object of the present invention is to provide an anti-idling system that will overcome the shortcomings of the prior art devices. A second object is to provide an electrification system which will significantly reduce the urban air pollution created by the target customers. A third object is to provide a secure method to access the plug and cord. A fourth object is to provide a management system which controls the flow of electricity from the pedestal. A fifth object is to provide a security capability which limits the risk of theft, vandalism to, or injury from the electrification plug and cord. A sixth objective is to provide an anti-idling system in a public space.

The details of one or more embodiments of the invention are set forth in the accompanying drawings and descriptions below. As to the accomplishment of the above and related objects, this invention may be embodied in the form illustrated in the accompanying drawings, while noting that the drawings are illustrative only and that changes may be made in the specific construction illustrated and described within the scope of the appended claims. The foregoing summary is not intended to summarize each potential embodiment or every aspect of the disclosure.

BRIEF DESCRIPTION OF THE SEVERAL VIEWS OF THE DRAWING

The foregoing summary, preferred embodiments, and other aspects of the subject matter of the present disclosure will be best understood with reference to a detailed description of specific embodiments. Various other objects, features, and attendant advantages of the present invention will become fully apparent and better understood when considered in conjunction with the accompanying drawings, in which like reference characters designate the same or similar parts throughout the several views, and wherein.

DETAILED DESCRIPTION OF THE INVENTION

Turning now descriptively to the drawings, in which similar reference characters denote similar elements throughout the several views, disclosed is a pedestal which provides anti-idling measures to vehicles[41] via a cord[7] and plug[8] using grid electricity. Various functions of the pedestal can be performed via different methods.

One function of the pedestal is authentication which can be accomplished via three different methods. For all methods of authentication, registered users and their respective information will be stored in a master online database on a remote server. Updates to the database will be pushed out to the pedestals and stored locally. This server has the ability to connect and manage all pedestals within the database. The server can communicate with the pedestals via mobile data or SMS. The pedestals report and interact with the server on a regular schedule. However, the pedestals can also be forced to update through a management panel on the remote server.

The first method of authentication is via an SMS text message or mobile app. The user will text a command, and their phone number will be verified against the online database. In this method, the SMS command gets sent directly to a remote server which then forwards the command to the pedestal after authentication. A second method of authentication is via an RFID tag[12] distributed to authorized users. The user swipes their RFID tag[12] against the pedestal and the pedestal then checks a local database for authentication. Once authenticated, the pedestal transmits usage data to the remote server. A third method of authentication is via a fingerprint reader[27]. Fingerprint information is stored locally and updated via the remote server. A user swipes a registered finger and the pedestal checks the fingerprint against the local database. Once authenticated the pedestal transmits usage data to the remote server.

Another function of the pedestal is a door[4] or protective mechanism which protects the plug[8] and cord[7] from theft and vandalism. One such embodiment is a swinging spring lock door[30]. The door[30], once it has been unlocked by the controller, is pushed open by the user and swings inward against a lightly spring-loaded hinge[31]. The user pulls the plug[8] out of the enclosure and lets go of the door[4] which then swings back and rests on the cord[7] with light, spring-loaded pressure. When the cord[7] retracts after use, as discussed below, it pushes the door[4] up on its hinge as the plug[8] passes into the enclosure. The door[30] is then free to swing back down and the controller locks it into place.

Figure 1A:
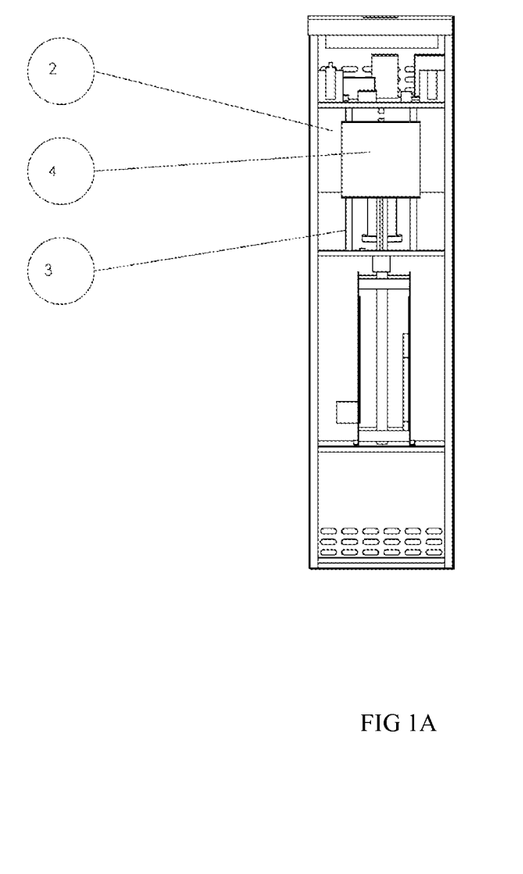
FIG. 1A is a front view of the electro mechanical pedestal with the door closed.
Figure 1B:
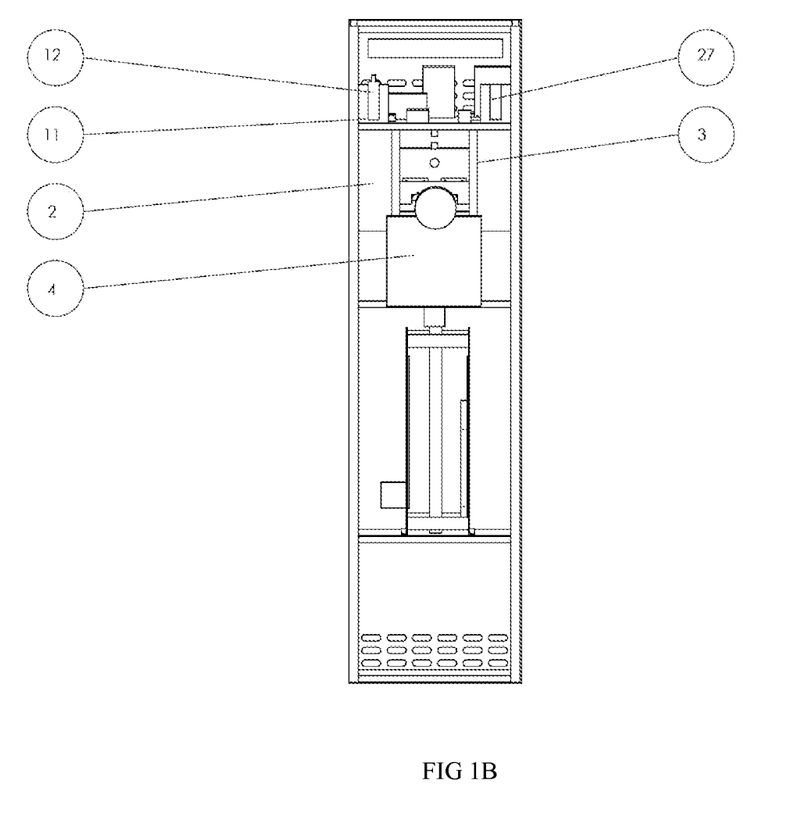
FIG. 1B is a front view of the electro mechanical pedestal with the door open.
Figure 1C:
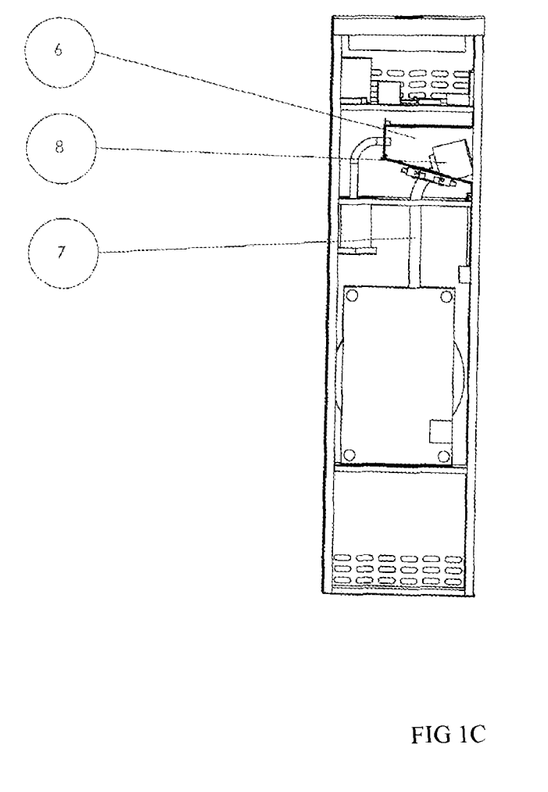
FIG. 1C is a side view of the electro mechanical pedestal.
Figure 1D:
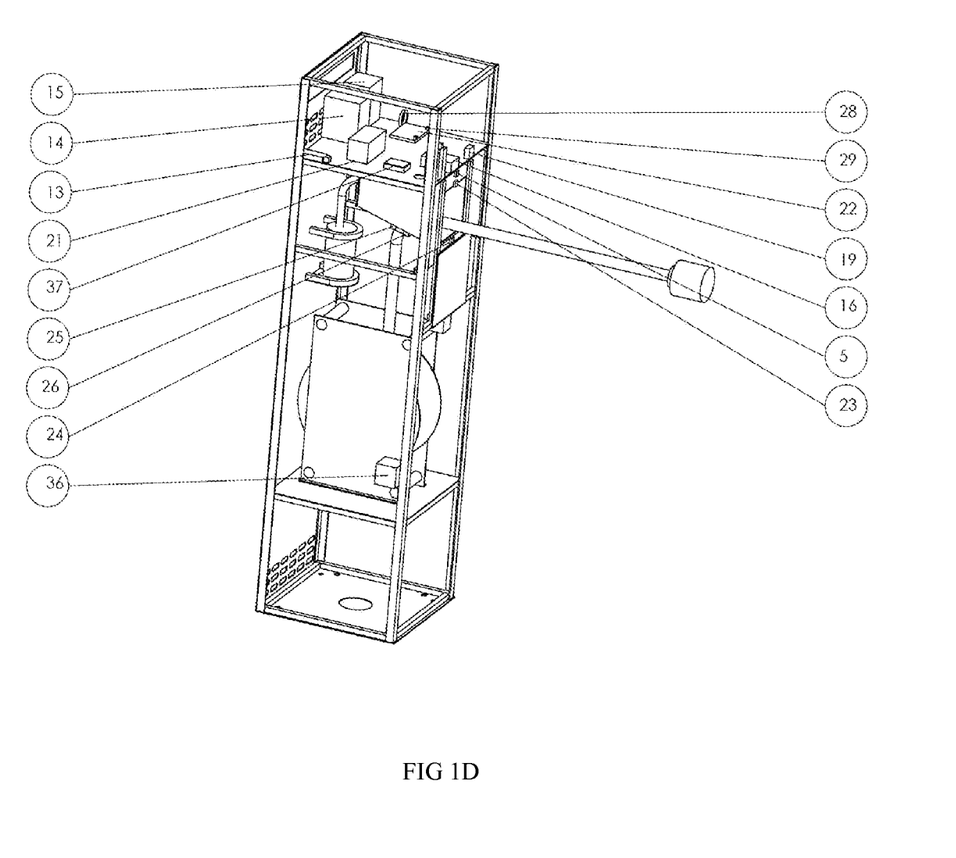
FIG. 1D is a top isolated view of the electro mechanical pedestal showing the electronics.
Figure 1E:
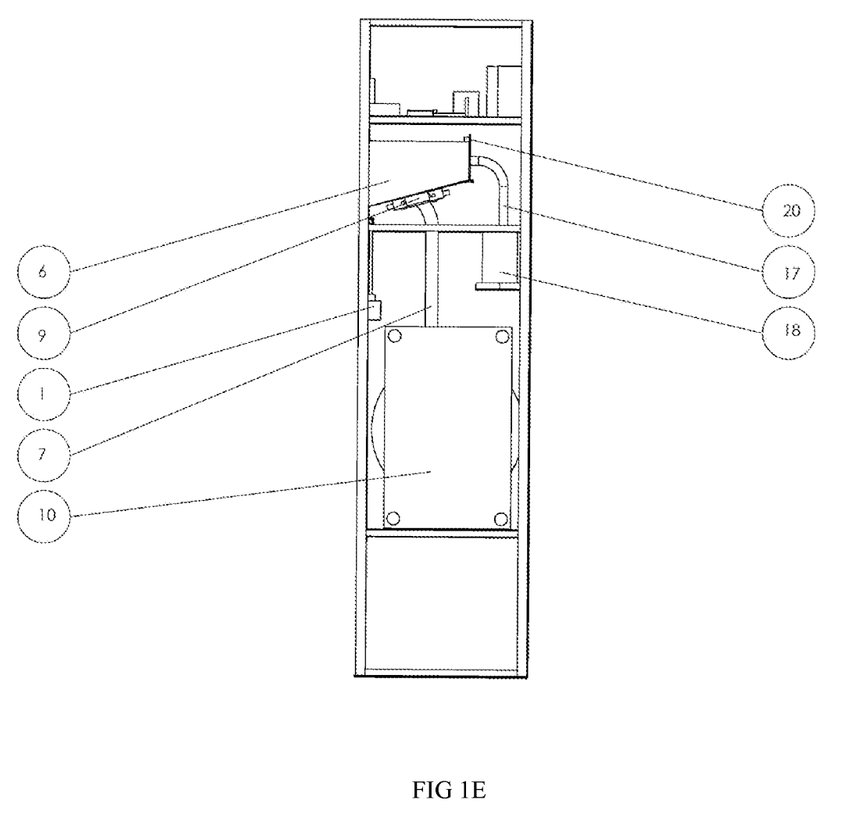
FIG. 1E is a full see through side view of the electro mechanical pedestal.
Figure 1F:
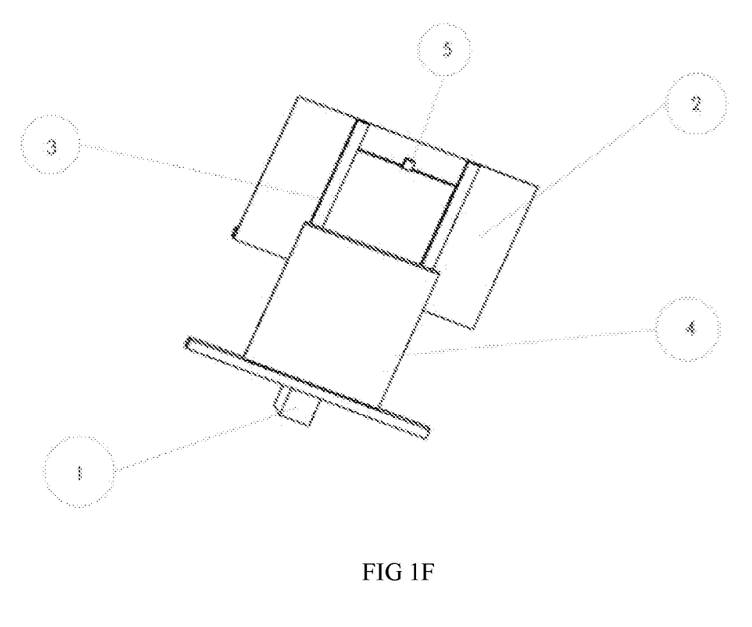
FIG. 1F is an illustration of the electro mechanical door mechanism.

A second embodiment is an electromechanical door[4] which slides up and down on rails[3]. In this embodiment, the user authentication would activate a lead screw motor[1] which opens the door[4]. This same motor[1] closes the door[4] once the plug[8] and cord[7] are retracted after use. There is an one or more IR sensor(s)[5] which detects whether an obstruction is blocking the sliding action of the door[4].

Figure 2A:
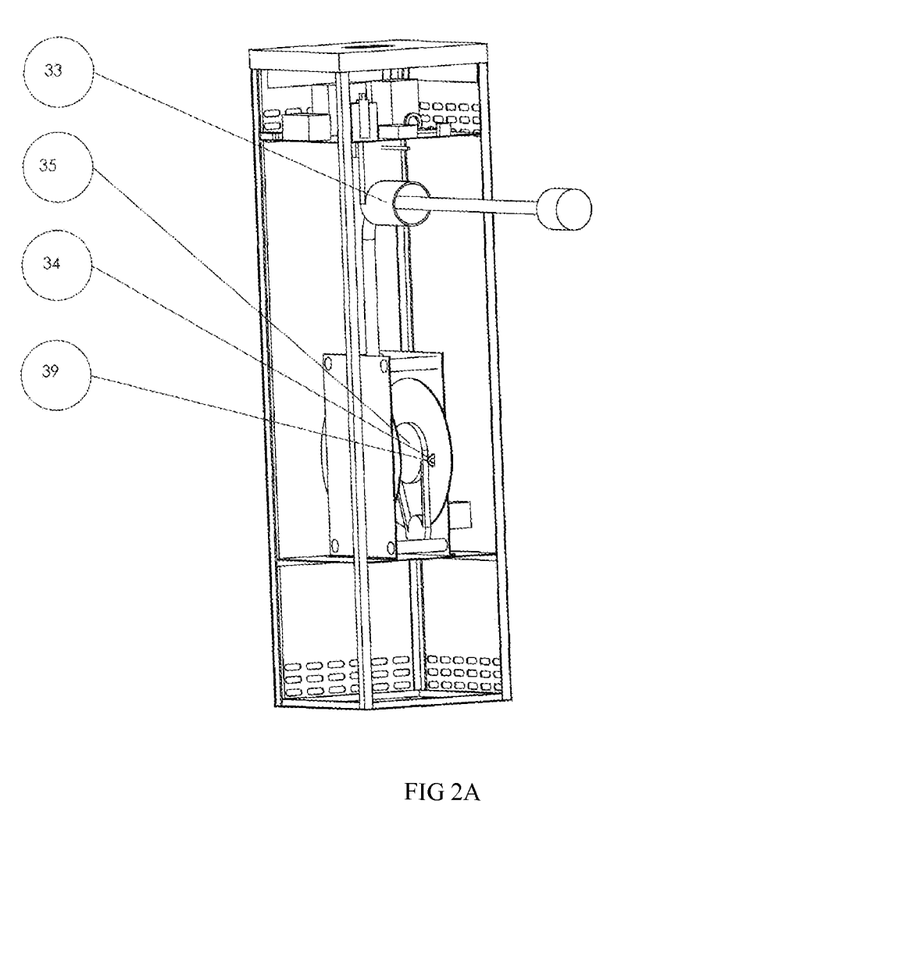
FIG. 2A is an isolated view of the tube cover pedestal with the plug outside.
Figure 2B:
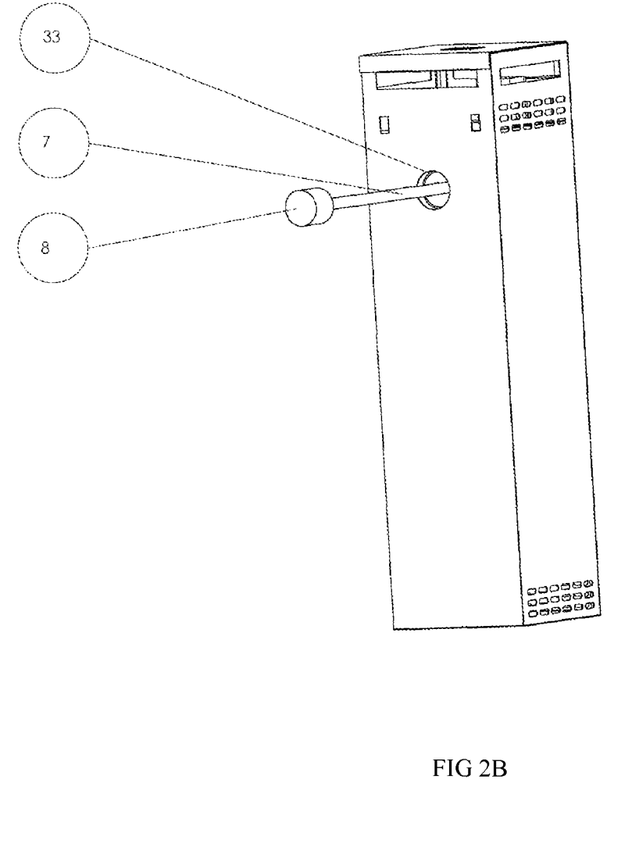
FIG. 2B is an isolated view of the tube cover pedestal with the tube retracted and the plug outside.
Figure 2C:
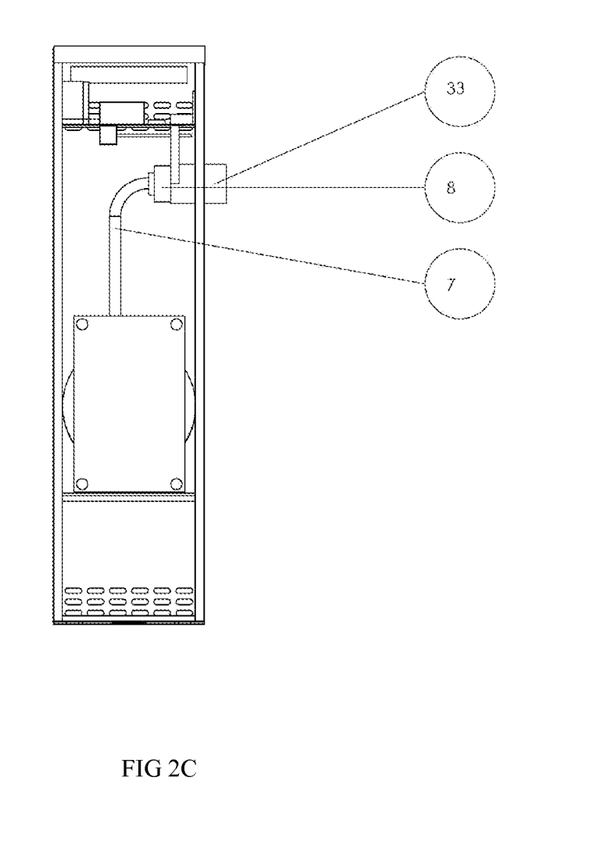
FIG. 2C is a side view of the tube cover pedestal with the tube extended and the plug retracted.

A third embodiment is a protective, actuated tube covering the plug[8] and cord[7], making them inaccessible without authentication. When a user authenticates, the protective tube[33] retracts back into the pedestal, thereby allowing the user to access the plug[8]. When the user is finished and the plug[8] is retracted to its resting position, the protective tube[33] slides back over the plug[8], thereby making it inaccessible to non-authenticated users.

Another function of the pedestal is cord[7] retraction which protects the plug[8] and cord[7] from theft and vandalism. One method of retraction is through the use of a motorized, uni-directional cord reel[10]. The plug[8] is grabbed by the user and pulled out freely to a desired length. When the cord[7] needs to be refracted, the motor[1] activates and retracts the cord[7] until it triggers a kill switch [26], turning off the motor[1]. A gearing mechanism allows the motor[1] to have influence only when the cord[7] needs to be retracted.

A second method of retraction is through the use of a spring loaded cord reel. The cord[7] is pulled out manually and locked at the desired length automatically by a ratcheting gear[35]. In order to retract the cord[7], an electronic solenoid[34] releases the locked gear[35] and allows the stored energy in the spring[39] to reel the cord[7] back in.

Figure 4:
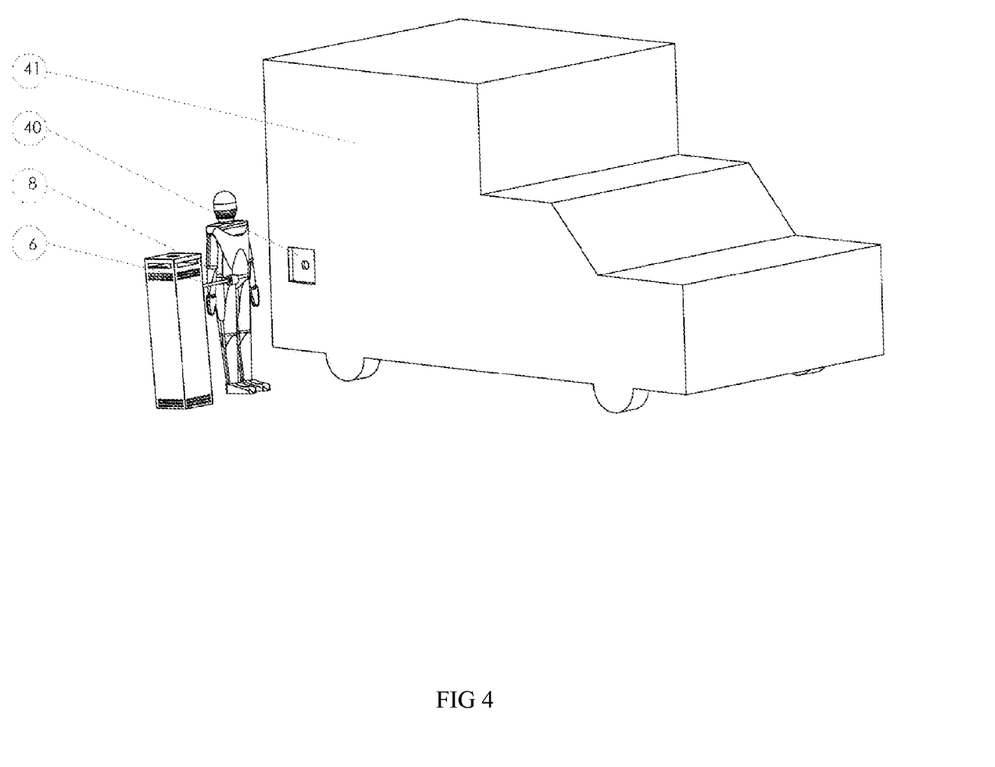
FIG. 4 is a view of the pedestal, paramedic, and ambulance

While not a specific function of the pedestal, there are two methods by which the plug[8] can be ejected from the charging vehicle[41]. One method of ejection is via an automatic ejection outlet[40] mounted on the vehicle[41]. A second method is via manual removal where the user unplugs the cord[7] from the vehicle[41].

When a user is ready to activate the pedestal, the user goes through one of the methods of authentication described above. Once the user is authenticated, the cord[7] is made available to the user via one of the methods of door[4] control described above. The user can then pull the cord[7] out to a desired length and attach it to the vehicle[41]. The user then goes through one of the methods of authentication a second time which tells the pedestal to activate the power cord[7]. The second authentication needs to occur within a predetermined time frame and the time frame can be adjusted based on use case by a technician remotely. If the user does not go through authentication a second time within the described time frame, the pedestal goes through a method of retraction and door[4] control into an idle state. If the user does go through a method of authentication a second time within the described time frame, the contactor is activated by the relay[29] and power is supplied to the vehicle[41]. When the user is finished using the electricity, the cord[7] is removed from the vehicle[41] via one of the methods of ejection described above. The pedestal then detects that there is no current running through the cord[7] and shuts of power going to the cord[7] with a relay[29]. The pedestal then retracts the cord[7] via one of the methods of retraction and door[4] control described above.

The pedestal incorporates a variety of components to complete the actions described above. The main control system for the pedestal is a Microcontroller[16] computer board. The board uses code such as Python, Java, etc. as a method for executing commands. The Microcontroller[16] is directly connected to a custom printed PCB[22] that allows it to interface with all of the sensors and control units. This includes circuits for a relay array, USB Hub[21] with independent 5V Power Supply, and connections for sensor switches.

A set of relays[29] connected to the main custom PCB[22] acts as a switch for some of the components mounted in the pedestal. The relays[29] are able to turn the contactor coil on or off, thereby controlling the outlets. The relays[29] are also able to reset the 3G GSM[13] card if needed. A contactor [14] is in place to control the flow of electricity to the outlet. The contactor[14] is activated by the relay board when the outlets are meant to be on and deactivated when the outlets are meant to be off. There is one meter[15] that is monitoring the energy flow in the outlet power cord[7]. This is connected to the PCB[22] and reports electricity usage via pulses. There is a Current Clamp[28] that surrounds the live line going to the cord reel[10] power input. This current clamp[28] is connected directly to the an input on the PCB [22] which tells the code such as Python, Java, etc. when there is current draw in the line. The 3G wireless modem is connected through the USB Hub[21] on the PCB board[22] which is then connected directly to the USB Hub[21] on the Microcontroller[16] board. The 3G Modem[37] can be reset via the relay board if necessary. The 3G Modem[37] is used in two ways. First, it can send and receive SMS messages and commands to and from the server. Second, it can open a GSM Data connection for retrieving remote files and communicating with the server.

Another component can be a front facing camera[19] mounted on all pedestals. This is connected to the Microcontroller[16] and used for a live video feed for troubleshooting to the management panel on the remote server.

There are four sensor switches connected to the PCB board[22]. All four are configured to be normally closed when decompressed. The first set of two of the switches are only available if the method of door control is electro-mechanical door[4] or actuated tube[33] methods. One of the two switches[24] is for monitoring when the door control method is in its open state. The second switch[23] is for monitoring when the door method state is in the closed position. The second set of two sensor[38] switches is for detecting when the cord[7] and plug[8] are fully retracted. These two switches perform the same function and are in place for redundancy. These switches are connected to inputs on the PCB[22] and monitored by a program such as Python, Java, etc. running on the Microcontroller[16]. When the switches are compressed, the program knows that the cord[7] has been fully retracted. This configuration is for all methods of retraction.

There are two kill switches[25,26] that cut the power supply for the cord reel motor[36]. The kill switches are normally closed when decompressed. The switches[25,26] are mounted on the first set of cord reel rollers[9] and are compressed when the cord[7] and plug[8] are fully retracted. These switches[25,26] are wired in series such that if one is tripped, the circuit is opened and no energy can flow to the cord reel motor[36]. This configuration is only in place for the electro-mechanical door[1] method of door control.

The RFID reader[12] is connected through the USB hub[21] mounted on the PCB[22]. This will read RFID tags used for one of the methods of authentication. The RFID reader[12] is mounted against the front facing sheet metal behind a frosted plexiglass port[11]. The plexiglass port[11] will allow for better RFID Radio Reception. The RFID Reader[12] is only in place for the RFID Method of authentication.

The fingerprint reader[27] is connected through the USB hub[21] mounted on the PCB[22]. The fingerprint reader [27] is mounted through a cutout in the front facing sheet metal and is directly exposed for user interaction. The fingerprint reader[27] is only in place for the fingerprint method of authentication.

Figure 3A:
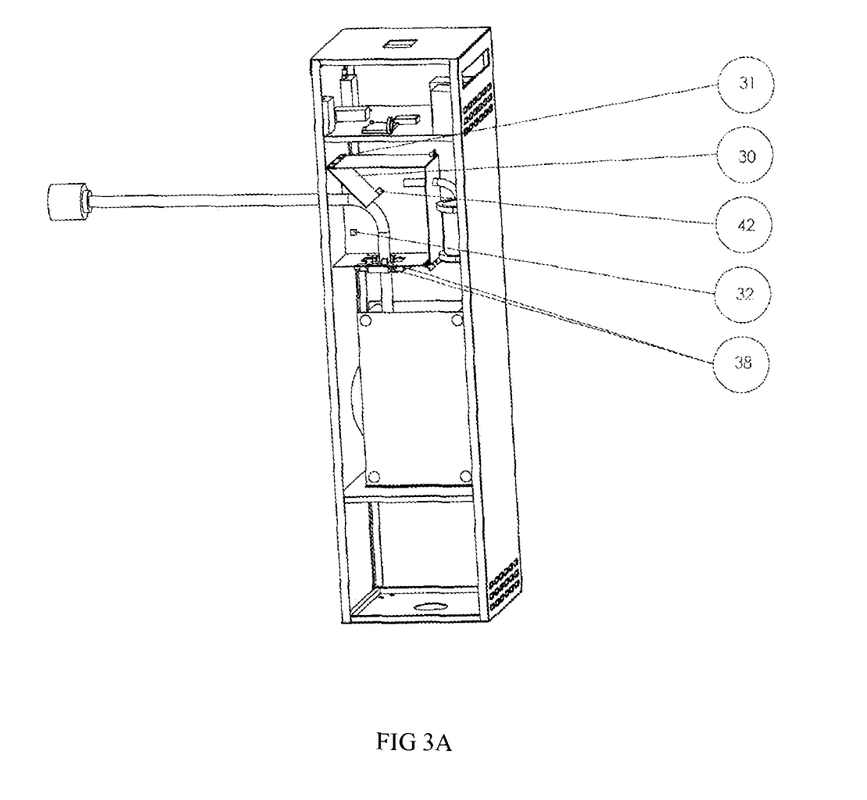
FIG. 3A is a side view of the spring loaded door pedestal with the plug outside.
Figure 3B:
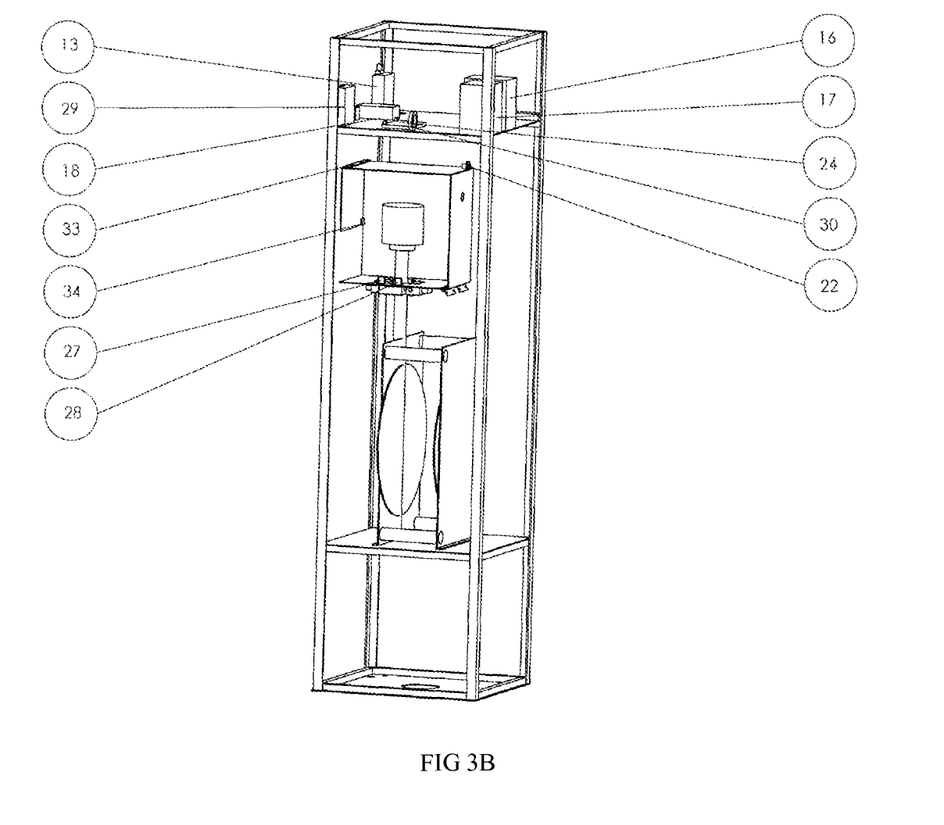
FIG. 3B is see through side view of the spring loaded door pedestal with the door closed and the plug inside.
Figure 3C:
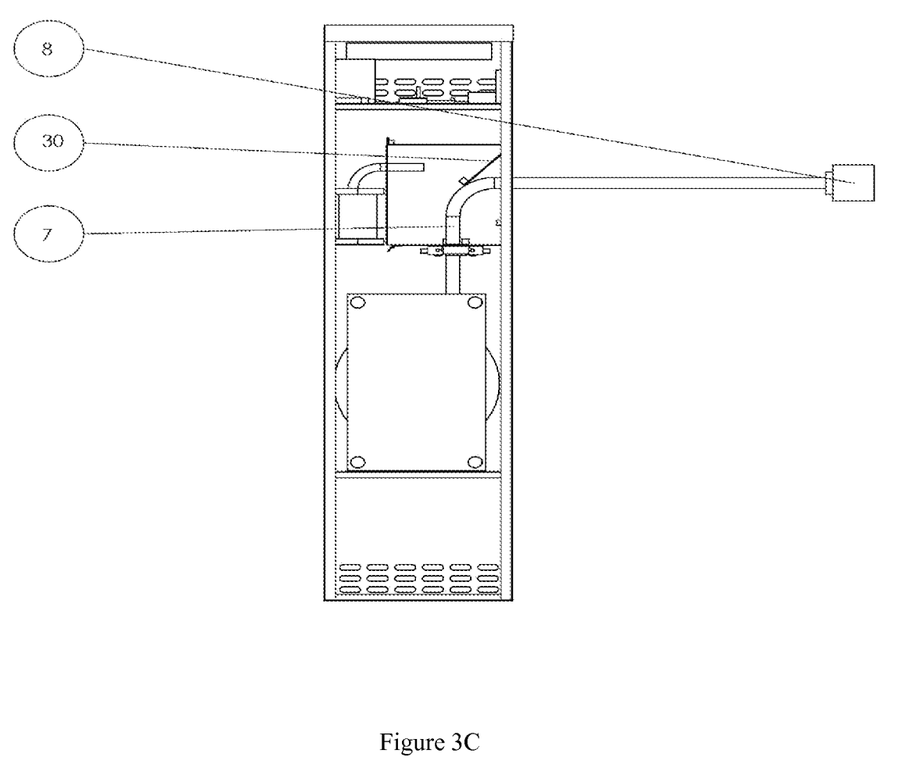
FIG. 3C is a side view of the spring loaded door pedestal with the plug outside.
Figure 3D:
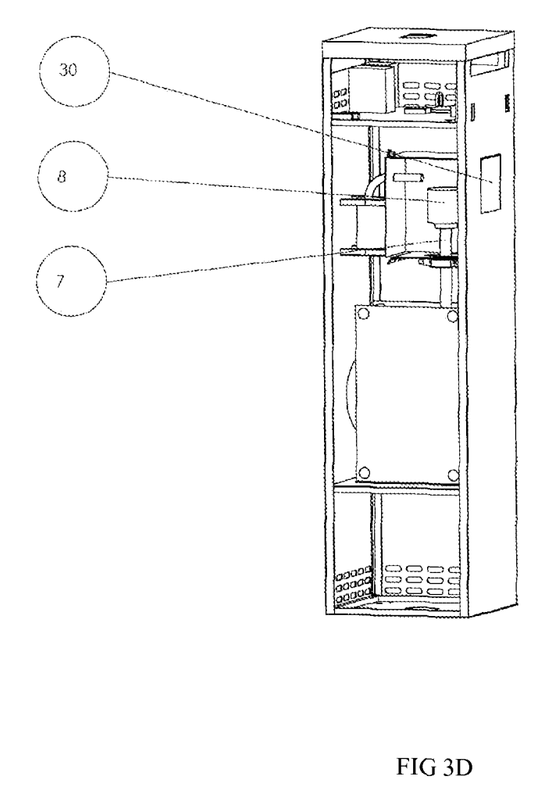
FIG. 3D is a side isolated view of the spring loaded door pedestal with the door closed and plug inside.

The hall effect sensor[32] monitors the position of the spring loaded door[30] in the spring loaded door method only. It is mounted perpendicular to the front panel on the lower left corner of the access box[6]. There is a small magnet[42] mounted on the bottom left corner of the spring loaded door[30]. The hall effect sensor[32] will detect the magnetic field of the magnet[42] and notify the program such as Python, Java, etc. that the door has been fully closed.

The IR sensor(s)[5] is used to detect debris that may have been placed into the access box[6] and access box panel[2] during operation. In the case of debris in the access box[6], a burst of compressed air from an air tank[18] flows into the access box through a nozzle[17]. The burst of air is controlled by a solenoid[20] that is activated when the IR sensor(s)[5] detects debris. The IR sensor(s)[5] also detects the presence of a user's hand and will prevent the door[4] and cord reel[10] from activating for safety reasons. Once the IR sensor(s)[5] detects that nothing is in the path of the door[4,30], the door[4,30] closes. The IR Sensor(s)[5] is only present in the electro-mechanical door[4] and spring loaded door methods[30].

As to a further discussion of the manner of usage and operation of the present invention, the same should be apparent from the above description. Accordingly, no further discussion relating to the manner of usage and operation will be provided. With respect to the above description, it is to be realized that the optimum dimensional relationships for the parts of the invention, to include variations in size, materials, shape, form, function and manner of operation, assembly and use, are deemed to be within the expertise of those skilled in the art, and all equivalent structural variations and relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described. Accordingly, all suitable modifications and equivalents may be resorted to falling within the scope of the invention. The foregoing description of preferred and other embodiments is not intended to limit or restrict the scope or applicability of the inventive concepts conceived of by the applicants.

We claim:
1. An anti-idling system for vehicles, comprising:
a cord having a first end comprising a specialized electrical plug and a second end configured for connection to an electric source;
a cord reel configured to receive the cord;
a pedestal configured to house the cord and the cord reel, said pedestal including a door; and a security mechanism including at least a processor having instructions operating thereon configured to cause the processor to determine whether a user is one of a plurality of authorized users;

wherein:

the door is configured to provide access to the specialized plug;

the door is configured to be closed until the security mechanism determines that the user is one of the plurality of authorized users;

the door comprises a swinging spring lock door, the swinging spring lock door is enabled to open when the security mechanism determines that the user is one of the plurality of authorized users; and the swinging spring lock door presses against the cord while the specialized electrical plug is in use, such that when the cord retracts after use, the door swings back into a closed configuration.

2. The system of claim 1, wherein the security mechanism is further configured to prevent the flow of electricity from the electric source to the specialized plug until the user is determined to be one of a plurality of authorized users.

3. The system of claim 1, wherein said security mechanism is configured on the pedestal.

4. The system of claim 2, wherein the security mechanism includes at least one of: an RFID reader and a fingerprint reader.

5. The system of claim 1, wherein said security mechanism is remote to the pedestal.

6. The system of claim 5, wherein said security mechanism determines that the user is one of the plurality of authorized users using at least one of: a mobile application and a text message.

7. The system of claim 1, wherein the swinging spring lock door is attached to an interior of the pedestal via a hinge arranged at the top of the door, such that when the door opens the door swings upwards and inwards around the hinge relative to the pedestal.

8. The system of claim 1, further comprising an IR sensor configured proximate to the door, said IR sensor configured to determine when there is an obstruction blocking operation of the door.

9. The system of claim 1, wherein the cord reel is configured to retract the cord when the specialized plug is not in use.

10. The system of claim 1, further comprising a detector configured to detect when the cord has been fully retracted, said detector configured to determine when there is an obstruction blocking operation of the door.

11. The system of claim 10, wherein:

when there is an obstruction blocking the operation of the door, the detector sends a signal to the security mechanism to prevent the flow of electricity from the electrical source to the specialized plug.

* * * * *